G. A. AICHER.
SALT HARVESTING MACHINE.
APPLICATION FILED AUG. 9, 1918.
1,377,999.
Patented May 17, 1921.
4 SHEETS—SHEET 2.
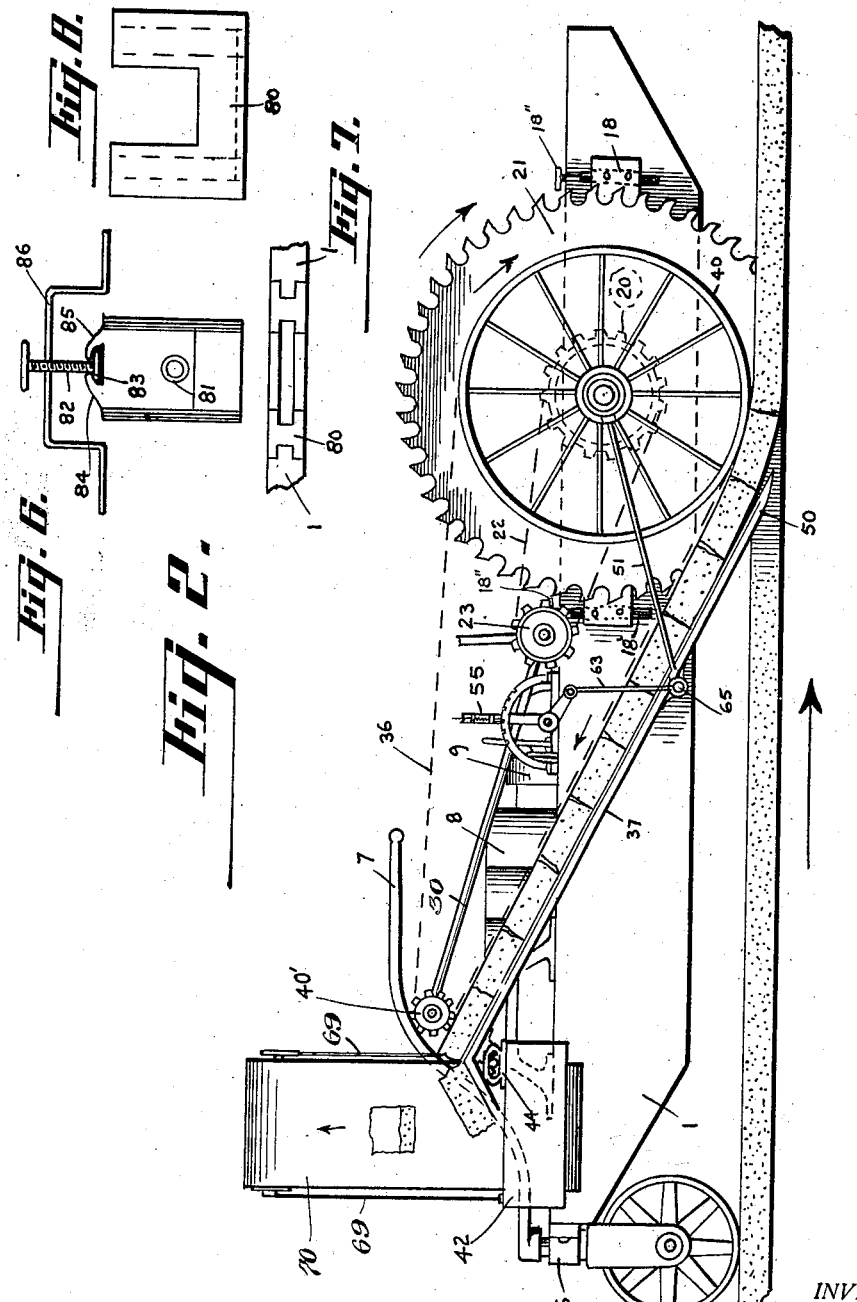

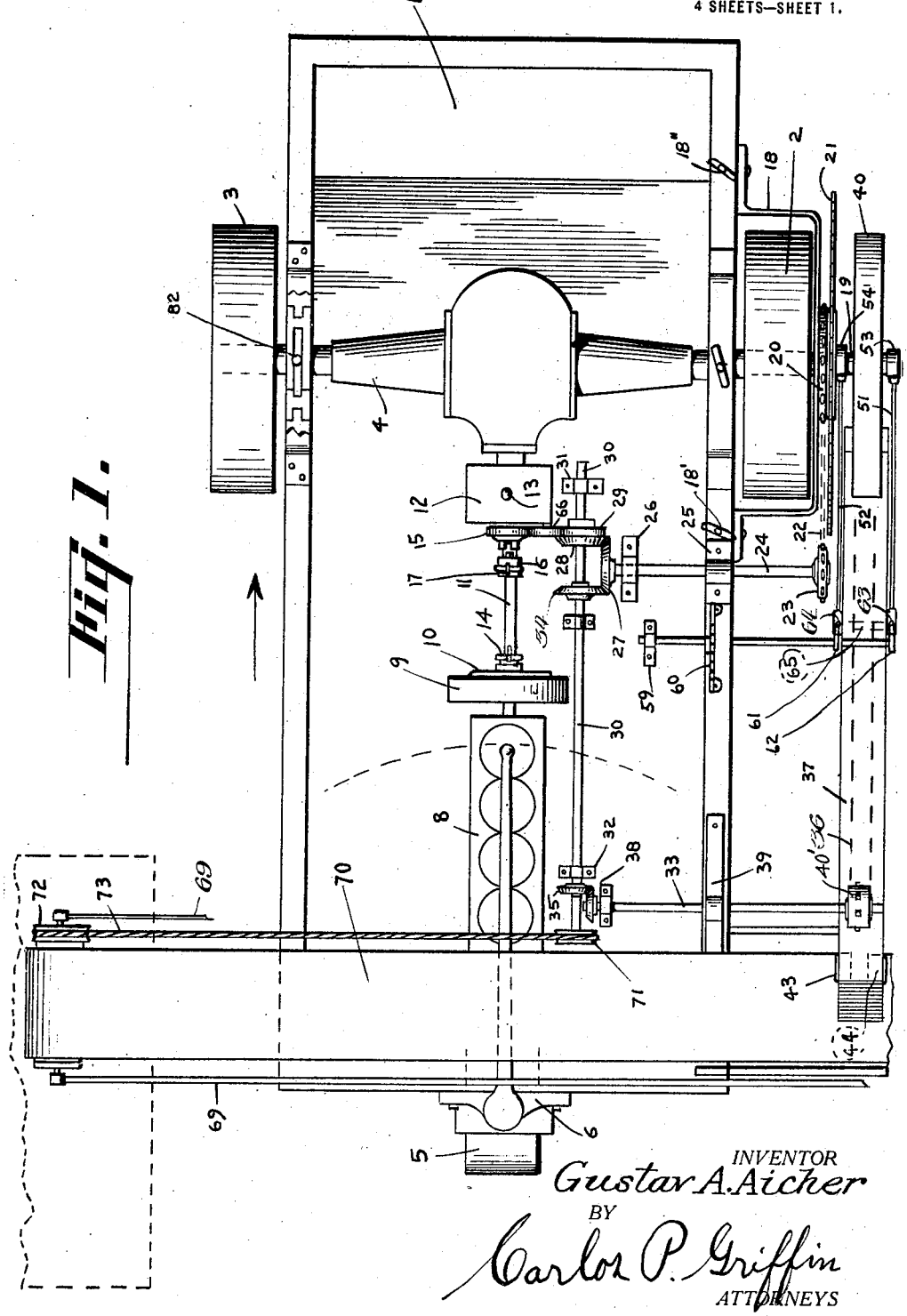

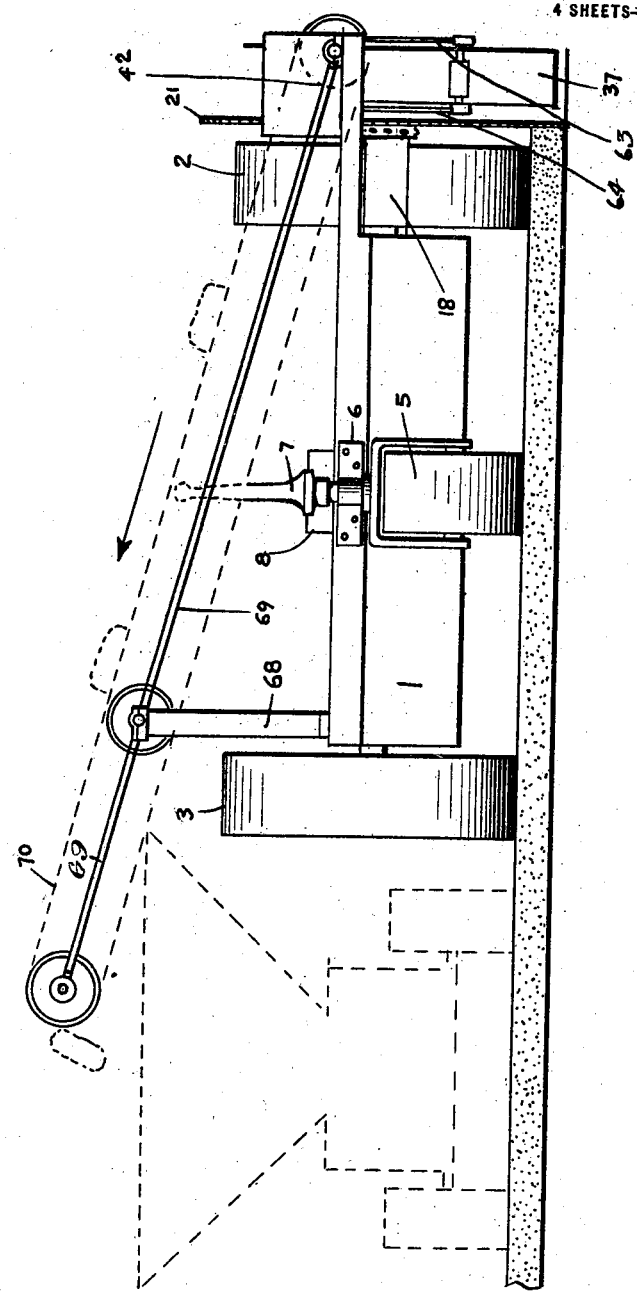

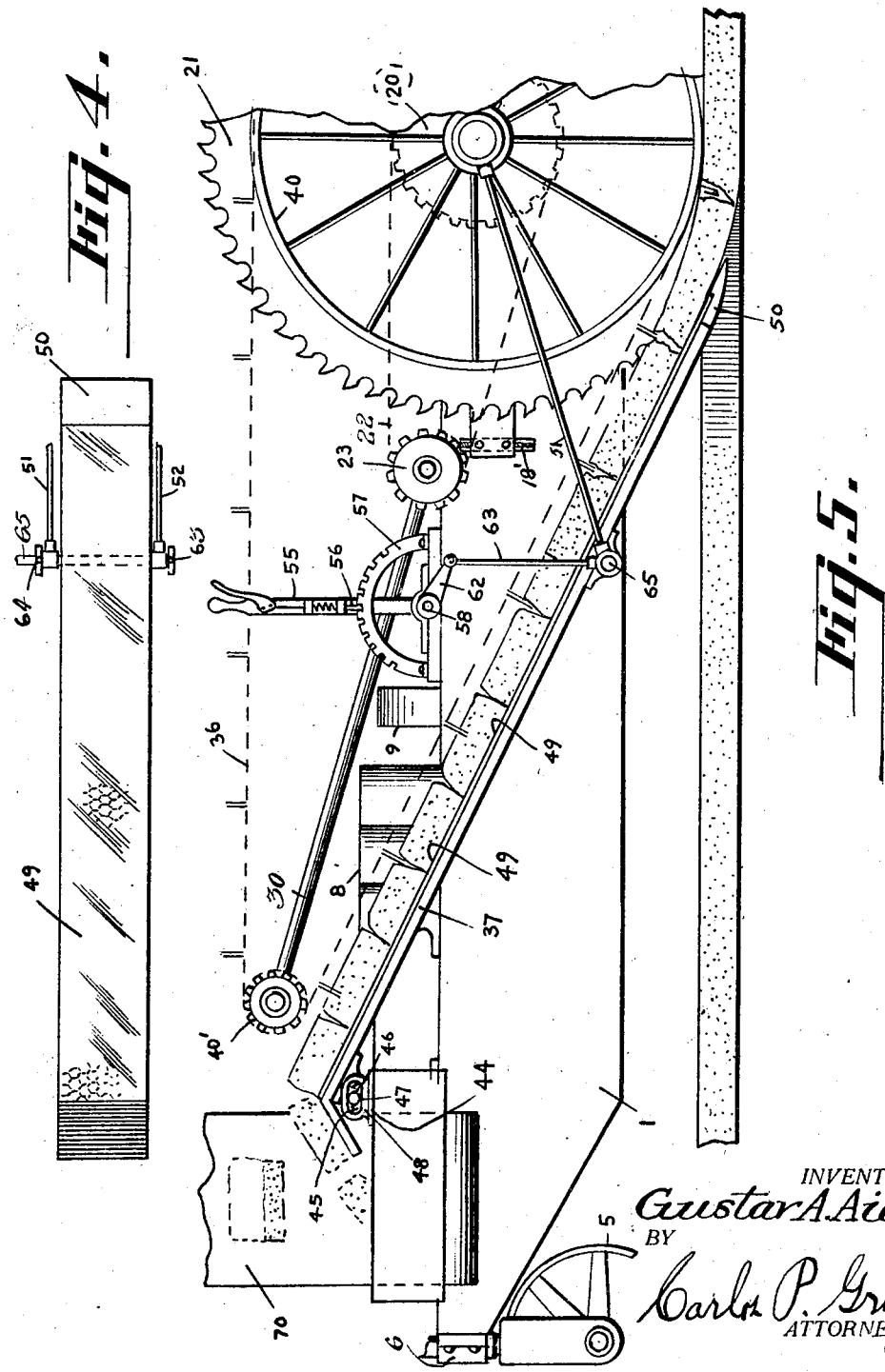

UNITED STATES PATENT OFFICE.

GUSTAV A. AICHER, OF SAN FRANCISCO, CALIFORNIA, ASSIGNOR TO ARDEN SALT COMPANY, OF SAN FRANCISCO, CALIFORNIA.

SALT-HARVESTING MACHINE.

1,377,999.　　　　　　　Specification of Letters Patent.　　Patented May 17, 1921.

Application filed August 9, 1918. Serial No. 249,213.

*To all whom it may concern:*

Be it known that I, GUSTAV A. AICHER, a citizen of the United States, residing at San Francisco, in the county of San Francisco, State of California, have invented a new and useful Salt-Harvesting Machine, of which the following is a specification, in such full and clear terms as will enable those skilled in the art to construct and use the same.

This invention relates to a salt harvesting machine, and its object is to provide a machine capable of harvesting a layer of salt from a salt bed either with the bed covered with water or after the water has been drained therefrom, a suitable barge being provided to prevent the water from having access to the operating machinery.

An object of the invention is to provide means whereby the cakes of salt cut will be delivered up a suitable chute and from there on to a suitable carrier to be discharged into wagons or cars for collecting the salt.

Other objects of the invention will appear as the description proceeds.

An embodiment of the invention is shown in the drawings in which the same reference numeral is applied to the same portion throughout, but I am aware that there may be modifications thereof.

Figure 1 is a plan view of the complete apparatus,

Fig. 2 is a side elevation of the salt harvesting machine looking from the side carrying the salt cutting saw, Fig. 3 is a rear end elevation of the salt harvester, Fig. 4 is a plan view of the chute indicating its lining, and showing the means for holding it in position, Fig. 5 is a side elevation on a slightly larger scale than Fig. 2, and showing certain details of construction, a portion of the apparatus being broken away for purposes of illustration.

Fig. 6 is a side elevation of the slidable bearing for raising and lowering the barge with respect to the axle supporting it, Fig. 7 is a plan view of the guide in which the bearing shown in Fig. 6 moves, and Fig. 8 is a side elevation of the guide shown in Fig. 7.

The numeral 1 indicates a suitable flat bottomed barge which is ordinarily supported by two wheels 2 and 3 revolubly connected with a fixed axle housing 4, and by a steering wheel 5 mounted in a box 6 to steer the apparatus in any desired direction, the tiller 7 being used to operate the steering wheel. Any suitable type of engine 8 is mounted in the barge, which engine has a fly wheel 9, clutch 10, drive shaft 11, and change gear 12. A suitable lever 13 is mounted upon the change gear box for the shifting of the gears in a well known manner to change the rate of advance of the apparatus. The clutch and the fly wheel is operated by means of a lever 14 in a well known manner, and the shaft 11 carries a gear 15 which may be engaged or disengaged with the sliding clutch collar 16, which latter is moved by means of the lever 17 to drive the saw and elevator apparatus at will.

It is intended that the apparatus shall be driven with the steering wheel in the rear in the direction indicated by the arrow on Fig. 1.

At the side of the barge there is a heavy U-shaped frame 18 through which support passes an extension 19 of the shaft driving the wheel 2 and on which is journaled a sprocket wheel 20, a saw 21 being secured on side of same. The sprocket wheel 20 is driven by means of a chain 22 from a sprocket gear 23 on a shaft 24. The shaft 24 is carried by two journal bearings 25 and 26, and it has a bevel gear 27 on one end in mesh with the bevel gear 28 on the side of the gear 29 on the shaft 30.

The shaft 30 is mounted in two bearings 31 and 32 and the gears 28 and 29 which are rigidly connected together are free to turn thereon so that while the saw is driven in the direction of the arrow noted on Fig. 2, the shaft 30 will be so turned as to drive the shaft 33 through the gears 34, 35 in the proper direction to cause the conveyer 36 to assist in working the salt blocks up the chute 37.

The shaft 33 is carried by two journal boxes 38, 39, and the chain 36 passes over wheels 40, 40' which bring said chain down close to the blocks of salt as they work up the chute, and the latter of which is the driving sprocket for the chain.

At the back of the barge there is a frame 42 which has a pair of slotted boxes 43, 44 in which springs 45, 46 are mounted to hold a rod 47 carrying the chute 37 in an approximately fixed position.

The chute 37 has a wire glass lining 49 and a steel shoe 50 to enable it to stand the necessary wear of the blocks of salt.

The shoe is pulled forward by means of two links 51, 52 which have suitable bearing collars 53, 54 surrounding the axle 19, and it is adjusted by means of the lever 55 carried on the upper surface of the barge 1, said lever having a suitable latch 56, Fig. 5 of the drawings, which engages teeth in a rack segment 57, resting on the upper surface of the barge 1. The lever 55 is carried by a shaft 58 journaled in two boxes 59, 60. This shaft 58 is provided with two arms 61, 62 which are in turn connected by means of two links 63, 64, Figs. 4 and 5, to the shaft 65 below the chute 37, and with which the links 51, 52 are connected. The springs in the slotted boxes 43, 44 enabling a slight adjustment of the chute to be made. An intermediate gear 66 connects the two gears 15 and 29 and enables the proper gear ratio to be used. A post 68 and suitable framework 69 supports a belt 70, and a pulley 71 on the shaft 30 enables the belt 70 to be driven, a pulley 72 and rope drive 73 being used to drive the belt 70 so that the blocks of salt will be delivered in a car illustrated in dotted lines in Fig. 3 at the side of the salt cutting apparatus.

In order to permit relative adjustment of the barge 1 and axially supporting wheels 2 and 3 and to prevent the water from entering the barge owing to different depths of water over the bed of salt, substantially U-shaped boxes 80 are set in opposite sides of the barge 1, and these boxes are vertically slotted to receive vertically adjustable flanged bearings 81 with which the ends of the shaft housing are connected, and said flanged boxes are raised and lowered to obtain the proper relative adjustment between the wheels supporting axle and the barge 1 by means of screws 82 which have heavy washers 83 on their lower ends and which engage lugs 84, 85 on said flanged boxes, a bar 86 bolted to the edge of the barge is provided with a threaded opening within which one of said screws 82 operates. The relative adjustment of screws 82 and bar 86 forming the means whereby the adjustment of axle and barge is carried out.

In operation, the engine is started and the barge is driven over the surface of the water or over the bed of salt in the direction indicated by the arrow on Figs. 1 and 2. At the same time, the saw is rotated at a more considerable rate of speed than the wheels supporting the barge, and as the salt is cut it is pushed up the chute 37 and lands upon the carrier 70, which discharges it into a wagon or car moving along the side of the salt cutting machine.

The adjusting screws 18' and 18" associated with the opposite ends of the plate 18 and carried by the frame 1 provide an adjustment for said plate 18 at such time as the bearings 81 are raised or lowered.

Having thus described my invention what I claim as new and desire to secure by Letters Patent of the United States is as follows, express reservation being made of permissible modifications.

1. A salt harvesting machine comprising a driving mechanism, a pair of supporting wheels therefor, a circular saw disposed at the outer side of one of said wheels for cutting the salt bed, means to rotate said saw, a chute at the side of the saw for picking up the salt blocks, and a carrier for moving the salt blocks transversely of the machine to a suitable point of discharge.

2. A salt harvesting machine comprising a driving mechanism, a wheeled support therefor, means to steer the support, a circular saw at the outer side of one of said wheels for cutting the salt, means to rotate said saw, a chute at the side of the saw for picking up the blocks of salt cut, and means to adjust the elevation of the lower end of said chute.

3. A salt harvesting machine comprising a driving mechanism, a wheeled support therefor, a circular saw exteriorly of the outer face of one wheel for cutting the salt bed, means to rotate said saw, a chute for picking up the blocks of salt cut, means to steer the machine, and mechanical means for assisting the salt blocks in traveling up the chute.

4. A salt harvesting machine comprising a driving mechanism, a wheeled support therefor, a circular saw exteriorly of the outer face of one of said supporting wheels for cutting the salt bed, a chute at the outer side of the saw for elevating the blocks of salt cut, means to adjust the elevation of the lower end of said chute, means to steer the machine, and a carrier extending transversely across the machine for elevating the salt blocks to a suitable place of discharge.

5. A salt harvesting machine comprising a barge having a steering wheel and a pair of wheels vertically adjustable with respect thereto, a circular saw carried in line with the axes of the latter wheels and positioned exteriorly of the outer face of one of said wheels of said pair for cutting the salt bed, and a chute adjacent the saw by which the blocks of salt travel to be collected.

6. A salt harvesting machine comprising a driving mechanism, a wheeled support therefor, a rotary cutter positioned at the outer side of one of said wheels for cutting the salt bed, means for operating said cutter, and a chute adjacent the cutter for picking up the blocks of salt.

In testimony whereof I have hereunto set my hand this 27 day of June, A. D. 1918.

GUSTAV A. AICHER.

Witness:
  W. T. HESS.